US012019404B2

(12) United States Patent
Kadmiri et al.

(10) Patent No.: US 12,019,404 B2
(45) Date of Patent: Jun. 25, 2024

(54) METHOD OF HARMONIC TUNING OF AT LEAST ONE GONG OF A WATCH STRIKING MECHANISM

(71) Applicant: Montres Breguet S.A., L'Abbaye (CH)

(72) Inventors: Younes Kadmiri, Morre (FR); Polychronis Nakis Karapatis, Premier (CH)

(73) Assignee: Montres Breguet S.A., L'Abbaye (CH)

( * ) Notice: Subject to any disclaimer, the term of this patent is extended or adjusted under 35 U.S.C. 154(b) by 469 days.

(21) Appl. No.: 17/400,760

(22) Filed: Aug. 12, 2021

(65) Prior Publication Data

US 2022/0187770 A1 Jun. 16, 2022

(30) Foreign Application Priority Data

Dec. 11, 2020 (EP) .................................... 20213374

(51) Int. Cl.
*G04D 7/00* (2006.01)
*G04B 21/08* (2006.01)
*G10K 1/00* (2006.01)

(52) U.S. Cl.
CPC ............... *G04D 7/00* (2013.01); *G04B 21/08* (2013.01); *G10K 1/00* (2013.01)

(58) Field of Classification Search
None
See application file for complete search history.

(56) References Cited

FOREIGN PATENT DOCUMENTS

| | | |
|---|---|---|
| CH | 708 885 A1 | 5/2015 |
| EP | 2 290 479 A1 | 3/2011 |
| EP | 3 211 488 A1 | 8/2017 |

OTHER PUBLICATIONS

European Search Report for EP 20 21 3374, dated May 26, 2021.

*Primary Examiner* — Renee S Luebke
*Assistant Examiner* — Matthew Hwang
(74) *Attorney, Agent, or Firm* — Sughrue Mion, PLLC

(57) ABSTRACT

A method for tuning a gong of a striking watch. The gong is fastened at one end to a gong holder, which can be mounted in a watch case. The gong is struck by a hammer to be vibrated on a support of the measuring instrument to determine by a fast Fourier transform frequency peaks in a band of audible frequencies. A comparison in a first natural mode of a vibration frequency in the plane XY with a vibration frequency outside the plane Z is performed and a ratio calculation $r=|f1p-f1h|/f1p$, where $f1p$ is the vibration frequency in the plane XY, and $f1h$ is the vibration frequency outside the plane Z. If the ratio r is less than or equal to a desired value of 0.006, the gong is tuned. If it is greater, the method is repeated until the ratio value is achieved.

7 Claims, 2 Drawing Sheets

METHOD OF HARMONIC TUNING OF AT LEAST ONE GONG OF A WATCH STRIKING MECHANISM

CROSS REFERENCE TO RELATED APPLICATIONS

This application claims priority to European Patent Application No. 20213374.0 filed Dec. 11, 2020, the entire contents of which are incorporated herein by reference.

The invention relates to a method of harmonic tuning of at least one gong of a watch striking mechanism. The striking mechanism comprises at least one gong fastened to a gong holder, and at least one hammer for striking the gong at predetermined times.

PRIOR ART

In minute repeater watches, the vibro-acoustic improvements mainly relate to the regulation elements, which allow to limit the noise of the mechanism when a striking is triggered. External elements are also made, which allow to increase the acoustic level of the striking. These external elements can also be acoustic radiation membranes or other radiating parts of the watch case.

Generally, a sound is generated by an element generating sound vibrations radiated by the external parts of the watch case and this generating element is mainly a gong of a striking mechanism. The vibration of the gong is produced by the impact generally near the gong holder of at least one hammer. This vibration is made up of several natural frequencies, the number and intensity of which, in particular in the audible range, depend on the geometry of the gong, the conditions of fastening or support of the gong, the shock conditions and the physical properties of the material.

It should be noted that the gong is rarely optimised. Improvements to the gong focus on its dimensions to target, on the one hand, a desired frequency and, on the other hand, to tune at least one of the partials of the hour and minute gong together. In this case, this is about tuning the melodic interval. The material constituting the gongs can also be an improvement factor to modify the frequency richness of the sound emitted. However, it is sometimes difficult to master the overall frequency content of the gong which depends on its dimensional shape and on the material chosen to make the gong.

In this regard, mention may be made of patent application EP 3 211 488 A1, which describes a gong of atypical shape in planar shape in a plane XY for a striking mechanism of a watch. The gong is connected at least at one of its ends to a gong holder, which can be fastened to an inner wall of the middle part of the watch. The gong comprises several notches made at geometric points defined over a portion of its length. This allows to adapt natural vibration frequencies in an audible band between 1 kHz and 5 kHz, to obtain a harmonic tuning defined beforehand for each gong and to make the generated sound harmonious. However, the adaptation of the natural frequencies by making these notches is irreversible. This is a disadvantage if it is sought to adapt other vibration frequencies of the gong. In addition, this does not allow to avoid any dissonance of a struck gong generating vibration frequencies in the plane and out of plane according to the proximity of these frequencies.

Patent application EP 2 808 745 A1 describes a striking mechanism for a watch, which comprises means for selecting a vibratory mode of a gong. For this purpose, the selection means comprise a selector element disposed in contact over part of the gong and held on a vibration node of a vibratory mode of the gong to be selected. This allows other vibratory modes to be blocked. This selector element can be displaced over a portion of the gong by a displacement means, which allows to select a vibratory mode in a non-irreversible manner. However, no possibility for optimising the configuration of the gong is described to adapt a vibration frequency in a non-irreversible manner in order to ensure fine tuning with the external parts of the watch. In addition, any dissonance of the sound following the striking of the gong by a hammer cannot be avoided depending on the vibration frequencies generated in the gong plane and outside the gong plane.

Patent application CH 707 078 A1 describes a gong for a striking mechanism. A device for adjusting the vibration frequency of the gong is provided. An element in the shape of an inertia-block is mounted on the gong to act on a part of the gong to perform local mechanical stress. This allows to adjust a vibration frequency of the struck gong. However, by acting with such a weight mounted on a portion of the gong, this does not allow to precisely adjust a natural vibration frequency. In addition, this does not allow to avoid all dissonance during the generation of vibration frequencies in the gong plane and outside the gong plane following the striking of the gong by a hammer.

SUMMARY OF THE INVENTION

The purpose of the invention is therefore to overcome the disadvantages of the aforementioned prior art by proposing a method of harmonic tuning of at least one gong of a striking watch configured to eliminate certain dissonances from the sound emitted by the watch when the gong is activated by the strike of the hammer.

To this end, the invention relates to a method of harmonic tuning of at least one gong of a striking watch, which comprises the features defined in independent claim 1.

Particular steps of the method of harmonic tuning of at least one gong of a striking watch are defined in dependent claims 2 to 9.

An advantage of the harmonic gong tuning method lies in the fact that the vibration frequencies in the watch plane XY in a basic natural mode or for subsequent partials in the audible frequency band between 20 Hz and 5 kHz, are made very close to the vibration frequencies outside the watch plane Z so as not to be perceived by the human ear. Thus, this allows to avoid any dissonance or beating, which leads to deterioration of the sound quality by such frequency coupling. The watch plane may correspond to the gong plane.

Advantageously, the method allows to tune the vibration frequencies in the plane XY and outside the plane Z in such a way as to respect the formula or ratio $r=|fip-fih|/fip\leq 0.006$ or $r'=|fih-fip|/fih\leq 0.006$, where fip is the vibration frequency in the plane XY of the $i_{th}$ natural mode selected, and fih is the vibration frequency outside the plane Z of the $i_{th}$ natural mode. The calculation of the ratio r or r' depends on the direction of strike of the hammer against the gong. The desired value of the ratio is always the same for each natural mode in the range of audible frequencies. If these vibration frequencies of each natural mode lead to a ratio r or r' of the order of 0.006 or even less, the gong is considered tuned. In this case, it does not generate any dissonance so that the human ear no longer distinguishes between the two frequencies that are too close to each other. The desired value of this ratio can also be defined less than or equal to 0.005 and it depends on a person's perception of sounds.

Advantageously, in order to be able to tune the vibration frequencies of the gong struck by a hammer either in the plane XY, or outside the plane Z, or also in an oblique direction, it is used an acoustic measuring instrument provided with a microphone unit, or with vibration measurement with a laser vibrometer or any other device for measuring the dynamic response of the gong. The gong can be placed on a suitable measuring support to be struck by a hammer outside the watch case or the gong can preferably be mounted directly in the watch case so as to be struck by the hammer of the striking mechanism. The measuring instrument may comprise an input microphone unit to pick up the sound of the struck gong, or comprise a vibrometer for vibration measurement. In addition, in a processor or microcontroller unit of the measuring instrument, an FFT analysis of the signal picked up by the microphone or by the laser vibrometer can be performed in order to obtain two frequency peaks which correspond to the vibration frequencies in the plane and outside the plane of the gong. Following this FFT analysis, it is possible to determine what adjustments to be carried out on the gong to have the two vibration frequencies, in the plane and outside the plane, sufficiently close to each other to avoid any dissonance of the sound generated by the struck gong.

It should also be noted that adjustments of the gong must be carried out if the ratio is greater than the value of 0.006. This mainly depends on the frequency difference between the vibration frequencies in the analysed natural mode.

BRIEF DESCRIPTION OF THE FIGURES

The purposes, advantages and features of the method of harmonic tuning of at least one gong of a striking watch will appear better in the following description, in particular with regard to the drawings wherein.

DETAILED DESCRIPTION OF THE INVENTION

In the following description, all the well-known parts of a striking mechanism of a striking watch, provided with at least one gong, will be described only briefly. Reference will be made exclusively to the method of harmonic tuning of at least one gong of a striking watch in such a way that the gong, once tuned, no longer generates dissonance or beat following the strike of a hammer in any direction, for example in the direction of the plane of the gong XY or in the out-of-plane direction of the gong Z or in an oblique direction.

Figure 1A:
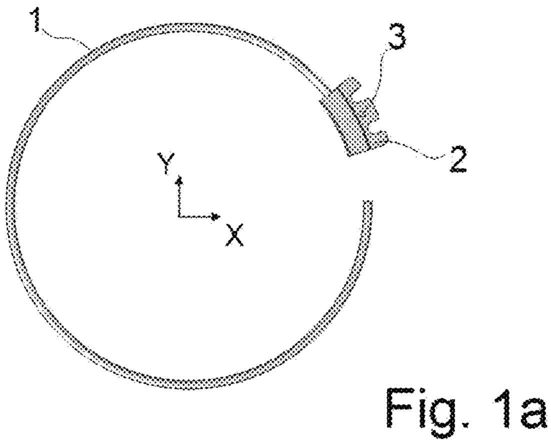
FIGS. 1*a* and 1*b* show a top view showing a plan view of a gong fastened to a gong holder and a side view showing an out-of-plan view of the gong before the strike of a hammer.
Figure 1B:
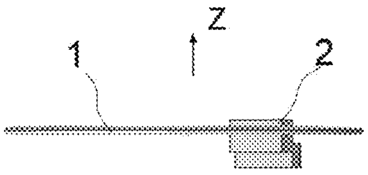

FIGS. 1*a* and 1*b* show only a gong 1 of a conventional arrangement mainly in the shape of a circular arc, which can be disposed around a watch movement when mounted in the watch case. The cross section of the gong 1 over part of its length or over its entire length may be circular, oval, hexagonal, octagonal, bean-shaped or other shapes. In this case, the gong is in a plane, which is the watch plane. It can also be considered that the cross section of the gong varies from one end to the other end.

As shown in FIG. 1*a*, this gong 1 in the shape of an arc of a circle is configured in a watch plane XY, which is here the gong plane XY with one end fastened to a gong holder 2, while another end is left free to move. It can also be considered to fasten the gong to the gong holder 2 in an intermediate part between the first end and the second end or also to fasten each end of the gong to a respective gong holder 2 without end that is free to move. FIG. 1*b* shows only the gong 1 in side view. The gong holder 2 is generally designed to be fastened by a fastening means 3, such as screws, on a support such as a watch movement plate, or optionally fastened to an inner surface of the middle part of the watch case or on another external element or even on a membrane. The gong 1 can be struck by a hammer not shown in a defined direction, for example in the direction of the gong plane XY or the direction outside the plane Z, or even also in an oblique direction. This generates a sound with one or more vibration frequencies depending on the number of partials generated in connection with the material constituting the gong and the conditions of shock between the hammer and the gong. Said hammer is generally intended to strike the gong 1 near the gong holder 2 on an inner side of the arrangement of the gong depending on the space available.

By striking the gong 1 with the hammer in a direction of the gong plane XY, it would be expected to generate at least one vibration frequency in the plane XY. That means that normally only the natural modes whose deformations are located in the plane XY must be activated. But in practice, depending on the machining tolerances of the gong 1, and again the clearances of the hammer in its pivoting, the striking of the hammer on the gong 1 activates at least two basic natural modes with, on the one hand, a vibration frequency in the plane XY and also an out-of-plane vibration frequency in the parasitic direction Z.

Figure 2A:
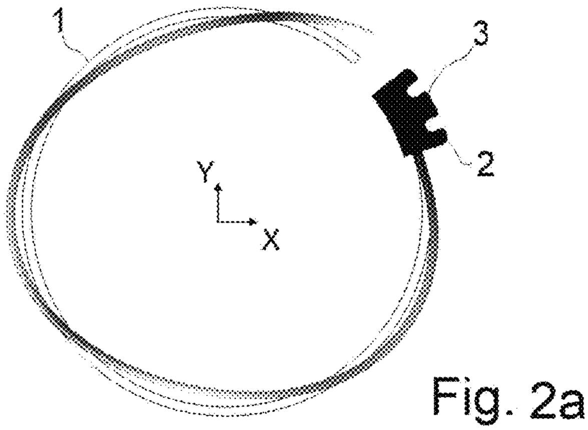
FIGS. 2*a* and 2*b* show a top view showing a plan view of a gong which is vibrating and fastened to a gong holder and a side view showing an out-of-plane view of the vibrating gong.
Figure 2B:
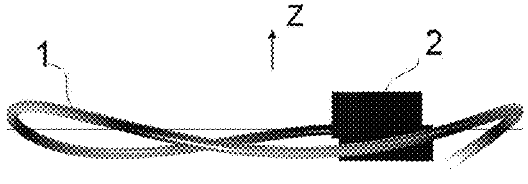

As a non-limiting example shown in FIGS. 2*a* and 2*b* of the vibrating gong 1, the frequency spectrum of the generated sound then contains the two frequencies 1'788 Hz and 1'731 Hz, which are on the one hand the vibration frequency in the plane XY, and on the other hand the out-of-plane vibration frequency in the direction Z. The two frequencies generated in the first natural mode of vibration are very close to each other and to a frequency difference likely to be perceived by the human ear in the predominantly defined audible frequency range of at least 20 Hz up to 5 kHz. In this range of audible frequencies, the perception of these two vibration frequencies by the human ear causes a dissonance or beat, which very clearly deteriorates the quality of the perceived sound.

So that the human ear is not able to perceive the two vibration frequencies, it is necessary to tune them in such a way as to respect the formula or ratio in absolute values $r=|fip-fih|/fip\leq 0.006$, where fip is the vibration frequency in the plane XY of the $i_{th}$ natural mode, and fih is the vibration frequency outside the parasitic plane Z of the $i_{th}$ natural mode. If these tuned vibration frequencies lead to a ratio of the order of 0.006, which is a target value or a defined threshold, then the sound generated by the striking of the gong is clear and harmonious and of course without perception of dissonance by the human ear, which is wanted. But as can be calculated with this example of vibration frequencies above, a ratio r=0.032 is reached, which is roughly 5 times greater than the expected value. The frequency difference between these two vibration frequencies must therefore be corrected. This is what the method of the present invention seeks to achieve.

The method also allows to tune the vibration frequencies in the plane XY and outside the plane Z in such a way as to respect the formula or ratio $r=|fip-fih|/fip \leq 0.006$ or $r'=|fih-fip|/fih \leq 0.006$, where fip is the vibration frequency in the plane XY of the $i_{th}$ natural mode selected, and fih is the vibration frequency outside the plane Z of the $i_{th}$ natural mode. The ratio r is selected in the case of a strike substantially in the plane of the gong XY, while the ratio r is selected in the case of a strike substantially outside the plane Z, that is to say perpendicular to the plane of the gong XY.

Of course as shown in FIGS. 1*a*, 1*b*, 2*a*, 2*b*, 3*a*, 3*b*, once the gong 1 is struck by the hammer, it generates a first base frequency f1*p*, f1*h* and several partials of higher frequency at least in the range of audible frequencies from 20 Hz to 5 kHz. For frequencies above 5 kHz, the proximity of two vibration frequencies in the plane and outside the plane is no longer of much importance, because they are no longer dissociated by the human ear. Tuning the vibration frequencies should be done primarily for frequencies in the audible frequency range of 20 Hz to 5 kHz. However, it can also be considered to perform the tuning of the gong 1 in a range of audible frequencies from at least 20 Hz to 10 kHz or 20 kHz.

To tune the gong 1 of the striking mechanism of the watch (not shown), it can be placed in particular by means of the gong holder on a suitable support of a measuring instrument to be struck by a hammer on the outside of the watch case. The gong 1 can also be directly part of the striking mechanism of the watch, in order to place the watch case comprising the striking mechanism with the gong 1 on a suitable support of the measuring instrument and control the striking of the gong 1 by the hammer of the mechanism at predetermined or programmed times.

Once the gong 1 is struck by the hammer, a microphone unit or a vibrometer of the measuring instrument can pick up the sound or vibration signal from the vibrating gong. A filtering of the sound or vibration signal can still be carried out, then a fast Fourier transform FFT operation of the filtered or non-filtered signal from the microphone unit or the laser vibrometer is carried out in a processor unit or in a microcontroller of the measuring instrument. A storage of the output signals after the FFT can still be carried out in the measuring instrument. A graphic representation of the different frequency peaks of several vibration frequencies in the plane XY and outside the plane Z as a function of the different audible modes of the vibrating gong, can be made after the FFT as shown for example in FIGS. 3*a* and 3*b* described below.

It should be noted that in general, the measuring instrument is adapted to measure the dynamic response of the gong once struck by the hammer. This means that the dynamic response comprises both a sound or audible signal, as well as a vibratory signal.

Figure 3A:
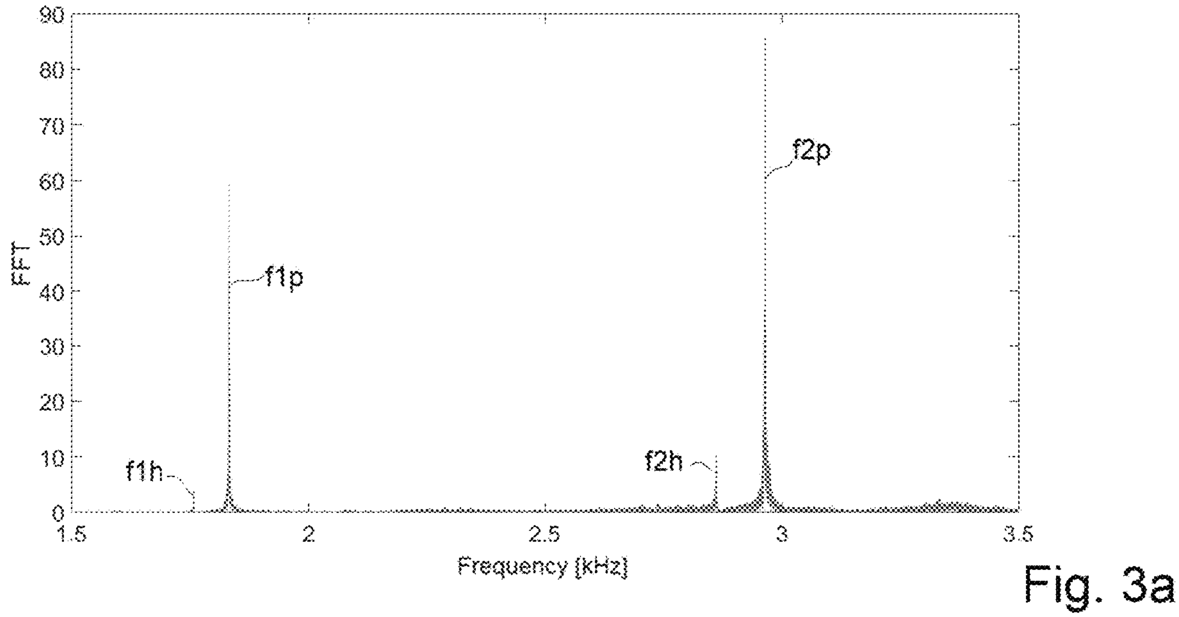
FIGS. 3*a* and 3*b* show a graph of an FFT analysis of a signal picked up for example by a microphone of the measuring instrument to represent frequency peaks at two partial frequencies on the one hand before adjusting the gong in FIG. 3*a*, and on the other hand after adjusting the gong in FIG. 3*b* with the two vibration frequencies close to each other at two frequency levels.
Figure 3B:
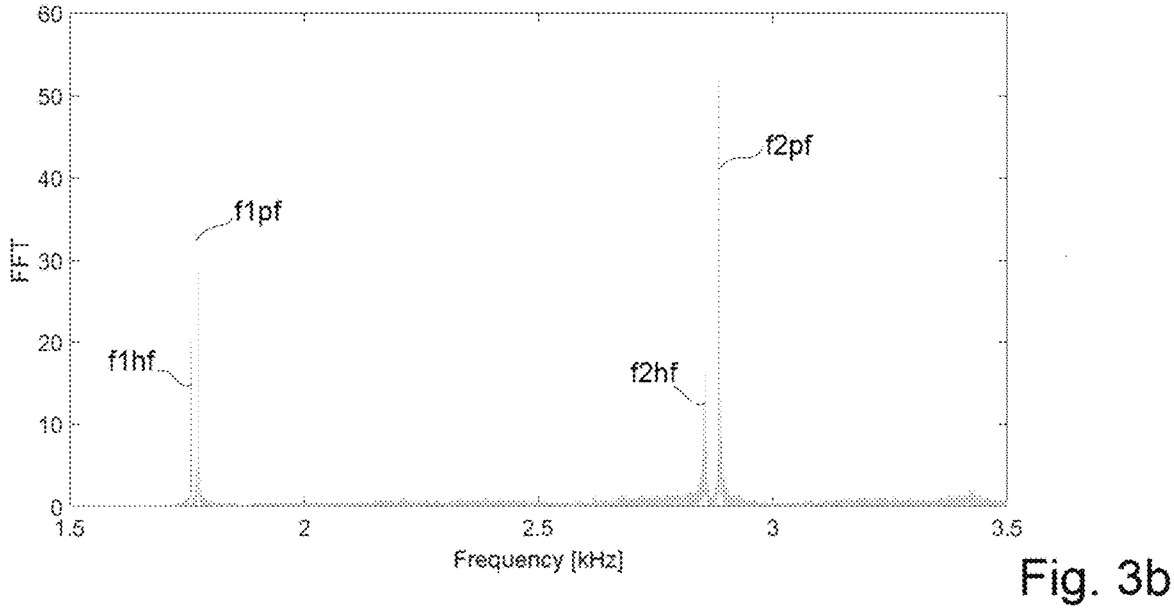

FIGS. 3*a* and 3*b* show graphs of an FFT analysis of a signal from the microphone unit or vibrometer. The output signals are recorded in the measuring instrument. The frequency peaks observed in FIGS. 3*a* and 3*b* relate to vibration frequencies in the plane XY and outside the plane Z of the vibrating gong. The vibration frequencies in the plane XY and outside the plane Z are observed on the one hand before modification of the gong, that is to say before carrying out an adjustment of said gong in FIG. 3*a*, and on the other hand after modification of the gong in FIG. 3*b*.

This vibration is composed of several natural or partial frequencies, two of which are shown in FIGS. 3*a* and 3*b* in the range of audible frequencies. This is a first natural frequency close to 1.7 kHz and a second natural frequency close to 3 kHz.

At the first natural frequency in FIG. 3*a*, two frequency peaks are generated, which are a first vibration frequency f1*p* in the plane XY and a first vibration frequency outside the plane f1*h* along the axis Z. At the second natural frequency, two frequency peaks are generated which are a second vibration frequency f2*p* in the plane XY and a second vibration frequency outside the plane f2*h* along the axis Z.

In FIG. 3*b* for the first natural frequency, after all the steps of final adjustment of the gong, two frequency peaks are generated which are a first vibration frequency of the gong tuned in the plane XY f1*pf*, and a first vibration frequency of the gong tuned outside the plane Z f1*hf*. At the second natural frequency, two frequency peaks are generated which are a second vibration frequency of the gong tuned f2*pf* in the plane XY and a second vibration frequency of the gong tuned outside the plane f2*hf* along the axis Z.

Once the control is carried out automatically by the measuring instrument or by vision on the graphs of FIGS. 3*a* and 3*b*, the ratio $r1=|f1p-f1h|/f1p$ and the ratio $r2=|f2p-f2h|/f2p$ must be calculated. It must then be determined whether each ratio r1 and r2 is less than or equal to the desired value of 0.006. If so, the gong is considered to be tuned, but if not, the gong should be tuned and at least one adjustment should be done, that is to say a localised machining on part of the gong and preferably near the gong holder. This machining, which is generally carried out by mechanical means, allows to carry out this adjustment in particular following knowledge of the frequency difference between the vibration frequency in the plane XY and the vibration frequency outside the plane Z of the first natural frequency and/or the second natural frequency.

Depending on prior knowledge of various previous stored adjustments and the result obtained, one or more successive adjustments on the gong can be performed until the ratio r1 and/or r2 is equal to or less than the desired value of 0.006. This means that after the first adjustment, the measuring instrument again picks up the sound generated by the vibrating gong. An FFT processing of the signal coming from the microphone is then carried out in order to control at the output the frequency peaks of the vibration frequencies in the plane XY and outside the plane Z of the first natural frequency and of the second natural frequency. A calculation of the ratios r1 and r2 is again performed to determine if each ratio is less than or equal to the desired value of 0.006. If so, no further corrections are made to the gong, while if not, a new adjustment operation must be carried out, and so on until the expected ratio is obtained.

This adjustment operation can be carried out manually or automatically. Under these conditions and depending on the various adjustments carried out previously and stored, each adjustment can preferably be carried out automatically by a machining tool of an automatic machining machine. It can be milling or grinding or crushing (plastic deformation). Several simulations depending on the frequency difference of the vibration frequencies in the plane XY and outside the plane Z allow to precisely establish the type of machining and the adjustment to be carried out in order to have the ratio r1 and/or r2 equal to or less than the desired value of 0.006 after very few successive adjustment steps.

As previously indicated, the purpose of this procedure is to bring the two frequency peaks closer together, that is to say the vibration frequency in plane XY mode and the vibration frequency in the out-of-plane Z mode so that the ratio described is less than or equal to 0.006. For this purpose, adjustments on the gong are carried out and each acoustic or vibratory recording is analysed after these adjustments to study the frequency content of the measured signal.

From experience, it is possible to know exactly where to perform the adjustment and the necessary size of the adjustment to be able to correct the two vibration frequencies in the plane XY and outside the plane Z in one operation at best. A database in the measuring instrument is designed in such a way that it automatically knows, according to the frequency peaks determined in the measuring instrument following the FFT analysis, what adjustment to be carried out precisely on the gong to correct and tune said gong at once.

It should also be noted that for all natural mode frequencies in the audible frequency range (0 to 5 kHz), a control is performed with the same ratio, which must be less than or equal to 0.006 so that the human ear no longer dissociates these two vibration frequencies close to each other. In addition, any shape of the gong can be considered, in particular or mainly with a shape lying in a plane so as to be able to control vibration frequencies in the plane XY and outside the plane Z. However, it can also be considered to have a gong describing a three-dimensional shape and not only in a plane, for example the gong could be in the shape of a corkscrew or the like. Regardless of the actual shape of the gong, a vibration in the plane XY, a vibration outside the plane Z of at least one natural mode or all natural modes are measured in the range of audible frequencies.

From the description which has just been given, several variants of the method of harmonic tuning of a gong can be designed by the person skilled in the art without departing from the scope of the invention defined by the claims. Each adjustment of the gong can be carried out mainly near the gong holder manually by a watchmaker, or automatically by a machining machine controlled by the measuring instrument, for example.

The invention claimed is:

1. A method of harmonic tuning of a gong (1) of a striking watch, the gong (1) being fastened to at least one gong holder (2) by at least one of a first end or a second end or by an intermediate portion located between the first end and the second end of the gong (1), and for which a ratio of vibration frequencies generated in a watch plane XY, and outside the watch plane along an axis Z following a strike of a hammer against the gong (1), the method comprising:

placing the gong (1) by means of its gong holder (2) on an adapted support of a measuring instrument or placing a watch case comprising a striking mechanism with the gong (1) on an adapted support of the measuring instrument, striking the gong (1) in a direction defined by the hammer which is external or forming part of the striking mechanism of the watch, picking up a dynamic response of the gong activated and vibrated by the strike of the hammer, by the measuring instrument, processing a dynamic response signal of the gong by performing a fast Fourier transform in a processor unit or in a microcontroller of the measuring instrument, determining at least two frequency peaks which correspond, in a selected natural mode, to the vibration frequencies in the plane XY and along the axis Z of the vibrating gong in an audible frequency band from 20 Hz to 5 kHz, calculating at least one ratio $r=|fip-fih|/fip\leq 0.006$ or $r'=|fih-fip|/fih\leq 0.006$, where fip is the vibration frequency in the plane XY of a $i_{th}$ selected natural mode, and fih is the vibration frequency outside the plane Z of the $i_{th}$ natural mode, the calculation of the ratio r or r' depending on the direction of striking of the hammer against the gong, and comparing the ratio r or r' to a desired value equal to 0.006 in such a way that if r or r' is equal to or less than the desired value of 0.006 the gong is considered tuned and if r or r' is greater than the desired value, a gong adjustment operation is carried out before repeating the steps of the method from the striking of the gong by the hammer.

2. The method of harmonic tuning of a gong (1) according to claim 1, wherein the dynamic response of the activated and vibrating gong is a sound or audible signal picked up by a microphone unit of the measuring instrument.

3. The method of harmonic tuning of a gong (1) according to claim 1, wherein the dynamic response of the activated and vibrating gong is a vibratory signal picked up by a laser vibrometer.

4. The method of harmonic tuning of a gong (1) according to claim 1, wherein all the natural frequencies of the gong in the audible frequency band from 20 Hz to 5 kHz are tuned.

5. The method of harmonic tuning of a gong (1) according to claim 1, for which the gong (1) is configured to be disposed in a gong plane which corresponds to the watch plane, wherein the gong is struck by the hammer in one direction of the gong plane and wherein the ratio $r=|fip-fih|/fip\leq 0.006$ is calculated to determine whether gong adjustment operations must be carried out.

6. The method of harmonic tuning of a gong (1) according to claim 1, for which the gong (1) is configured to be disposed in a gong plane which corresponds to the watch plane, wherein the gong is struck by the hammer in a direction along the axis Z, perpendicular to the watch plane or in a direction of an oblique strike, and wherein the ratio $r'=|fih-fip|/fih\leq 0.006$ is calculated to determine whether gong adjustment operations must be carried out.

7. The method of harmonic tuning of a gong (1) according to claim 1, wherein each adjustment of the gong is carried out by milling or grinding or by local crushing of the gong material.

* * * * *